(12) United States Patent
Bollella (10) Patent No.: US 12,478,326 B2
(45) Date of Patent: Nov. 25, 2025

(54) BIO-PATCH HAVING ARTIFICIAL CAPILLARIES TO PROVIDE CONTINUOUS BLOOD FLOW

(71) Applicant: LIFE PATCH INTERNATIONAL, Irvine, CA (US)

(72) Inventor: Donald Bollella, Irvine, CA (US)

( * ) Notice: Subject to any disclaimer, the term of this patent is extended or adjusted under 35 U.S.C. 154(b) by 834 days.

(21) Appl. No.: 17/669,698

(22) Filed: Feb. 11, 2022

(65) Prior Publication Data

US 2022/0257190 A1 Aug. 18, 2022

Related U.S. Application Data (60) Provisional application No. 63/149,044, filed on Feb. 12, 2021.

(51) Int. Cl.
| | | |
|---|---|---|
| A61B 5/00 | (2006.01) | |
| A61B 5/15 | (2006.01) | |
| A61B 5/151 | (2006.01) | |
| G01N 33/80 | (2006.01) | |

(52) U.S. Cl.
CPC .......... *A61B 5/6833* (2013.01); *A61B 5/0022* (2013.01); *A61B 5/150022* (2013.01); *A61B 5/151* (2013.01); *A61B 5/746* (2013.01); *G01N 33/80* (2013.01)

(58) Field of Classification Search
CPC . A61B 5/6833; A61B 5/150022; A61B 5/151; A61B 5/746; A61B 5/150977; A61B 5/157; A61B 5/14503; A61B 5/1459; A61B 5/14865; G01N 33/80
See application file for complete search history.

(56) References Cited

U.S. PATENT DOCUMENTS

| | | | |
|---|---|---|---|
| 9,173,988 B2 * | 11/2015 | Barrett | A61M 1/3609 |
| 9,987,427 B1 * | 6/2018 | Polsky | A61B 5/150984 |
| 2009/0054737 A1 * | 2/2009 | Magar | A61B 5/7405 |
| | | | 600/300 |
| 2018/0338713 A1 * | 11/2018 | Miller | A61B 5/157 |
| 2022/0226567 A1 * | 7/2022 | Pananen | A61M 5/3287 |

* cited by examiner

*Primary Examiner* — Eric F Winakur
*Assistant Examiner* — Noah M Healy
(74) *Attorney, Agent, or Firm* — Chang & Hale LLP (57) ABSTRACT

In some embodiments, a wearable patch can include a patch structure having one or more layers and configured to allow the patch to be worn by a user. The patch can further include an assay component implemented on or at least partially within the patch structure, and configured to obtain a blood sample of the user and perform an assay on the blood sample. The patch can further include a flow assembly having one or more input needles in communication with the assay component and one or more output needles in communication with the assay component to provide a continuous flow of blood for the assay component to thereby allow the blood sample to be obtained by the assay component. Each of the one or more input needles and one or more output needles can be configured to interface with a respective capillary in a tissue of the user.

20 Claims, 11 Drawing Sheets

BIO-PATCH HAVING ARTIFICIAL CAPILLARIES TO PROVIDE CONTINUOUS BLOOD FLOW

CROSS-REFERENCE TO RELATED APPLICATION(S)

This application claims priority to U.S. Provisional Application No. 63/149,044 filed Feb. 12, 2021, entitled BIO-PATCH HAVING ARTIFICIAL CAPILLARIES TO PROVIDE CONTINUOUS BLOOD FLOW, the disclosure of which is hereby expressly incorporated by reference herein in its entirety.

BACKGROUND

Field

The present disclosure relates to wearable patches having artificial capillaries to provide continuous blood flow.

Description of the Related Art

In many analytic applications, blood is drawn from a person, typically in a clinic setting. Such a blood sample is then sent to a laboratory where one or more analyses are performed to provide a result. Such a result is typically representative of a health condition of the person.

SUMMARY

In accordance with some implementations, the present disclosure relates to a wearable patch that includes a patch structure having one or more layers and configured to allow the patch to be worn by a user. The patch further includes an assay component implemented on or at least partially within the patch structure, and configured to obtain a blood sample of the user and perform an assay on the blood sample. The patch further includes a flow assembly having one or more input needles in communication with the assay component and one or more output needles in communication with the assay component to provide a continuous flow of blood for the assay component to thereby allow the blood sample to be obtained by the assay component. Each of the one or more input needles and one or more output needles is configured to interface with a respective capillary in a tissue of the user.

In some embodiments, the wearable device can further include an interface component implemented on or at least partially within the patch structure, and in communication with the assay component. The interface component can be configured to provide a notification based on a result of the assay.

In some embodiments, the patch structure can be configured to allow the patch to be worn on or near a skin of the user. In some embodiments, the patch structure can be configured to allow the patch to be worn directly on the skin of the user.

In some embodiments, the interface component can be configured to alert the user when the assay result indicates a change that affects health of the user.

In some embodiments, the interface component can include a communication circuit configured to send information about the assay result. In some embodiments, the communication circuit can be configured to receive information. In some embodiments, the communication circuit can be configured to send the information in a wireless manner and/or a wired manner. In some embodiments, the communication circuit can be configured to send the information to an external device.

In some embodiments, each needle can include a base structure having an insertion end to allow flow of the blood through the insertion end. Each needle can further include a coating that covers the base structure and configured to promote the interfacing of the needle with the capillary. In some embodiments, the coating can include an artificial skin material configured to allow formation of a capillary about the needle.

In some teachings, the present disclosure relates to a kit for monitoring health condition of a user. The kit includes a wearable patch having a patch structure having one or more layers and configured to allow the patch to be worn by a user. The patch further includes an assay component implemented on or at least partially within the patch structure, and configured to obtain a blood sample of the user and perform an assay on the blood sample. The patch further includes a flow assembly having one or more input needles in communication with the assay component and one or more output needles in communication with the assay component to provide a continuous flow of blood for the assay component to thereby allow the blood sample to be obtained by the assay component. Each of the one or more input needles and one or more output needles is configured to interface with a respective capillary in a tissue of the user. The kit further includes a printed instruction configured to facilitate use of the wearable patch.

In some implementations, the present disclosure relates to a blood analysis system that includes a wearable patch that includes a patch structure having one or more layers and configured to allow the patch to be worn by a user. The wearable patch further includes an assay component implemented on or at least partially within the patch structure, and configured to obtain a blood sample of the user and perform an assay on the blood sample. The wearable patch further includes a flow assembly having one or more input needles in communication with the assay component and one or more output needles in communication with the assay component to provide a continuous flow of blood for the assay component to thereby allow the blood sample to be obtained by the assay component. Each of the one or more input needles and one or more output needles is configured to interface with a respective capillary in a tissue of the user. The wearable patch further includes an interface component implemented on or at least partially within the patch structure, and in communication with the assay component. The system further includes a monitor capable of communicating with the wearable patch to allow the wearable patch to communicate a result of the assay to the monitor.

In some embodiments, the interface component of the wearable patch can be configured to support the communication between the wearable patch and the monitor.

In some embodiments, the patch structure can be configured to allow the patch to be worn on or near a skin of the user, and the monitor can include an external device and/or an application being executed in the external device. In some embodiments, the external device can be a wireless device, and the communication between the wearable patch and the wireless device can include wireless communication. In some embodiments, the wireless device can include a smartphone.

In some embodiments, the wearable patch can be configured to receive a control signal from the monitor.

In some embodiments, the system can further include another wearable patch substantially same as the wearable patch, and the other wearable patch can be configured to allow communication with the monitor. In some embodiments, the wearable patch and the other wearable path can be configured to allow communication therebetween.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1A:
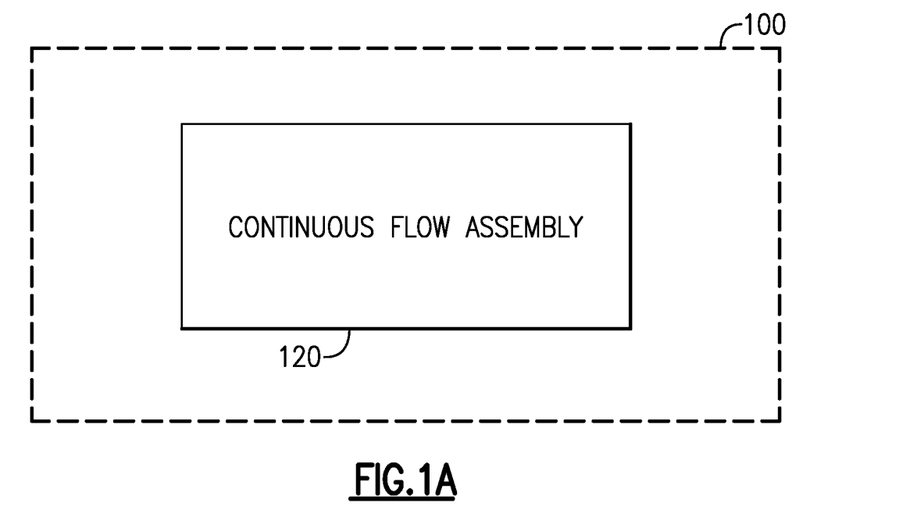
FIG. 1A depicts a block diagram of a wearable patch having a continuous flow assembly.

FIG. 1A depicts a block diagram of a wearable patch 100 having a continuous flow assembly 120. As described herein, such a continuous flow assembly can include an inlet path and an outlet path, with each path configured to form and/or support an artificial capillary to facilitate continuous flow of fluid such as blood. For the purpose of description, the wearable patch 100 may be referred to herein as a bio-patch, or simply as a patch.

Figure 1B:
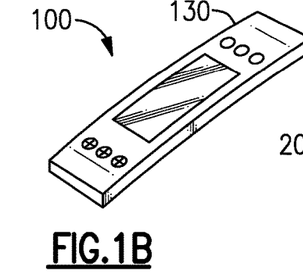
FIG. 1B shows a perspective view of a wearable patch that can be an example of the wearable patch of FIG. 1A.

FIG. 1B shows a perspective view of a wearable patch 100 that can be an example of the wearable patch 100 of FIG. 1A. As described herein, such a wearable patch can include an assay component 130.

Figures 1C, 1D:
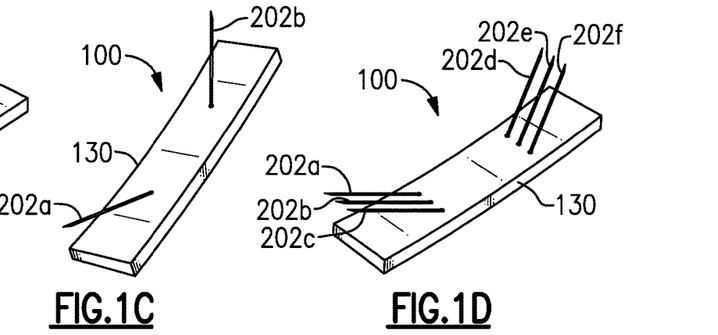
FIG. 1C shows a perspective view of an underside of a wearable patch that can be implemented for the wearable patch of FIG. 1B.
FIG. 1D shows a perspective view of an underside of a wearable patch that can be implemented for the wearable patch of FIG. 1B.

FIG. 1C shows a perspective view of an underside of a wearable patch 100 that can be implemented for the wearable patch 100 of FIG. 1B. In the example of FIG. 1C, the wearable patch 100 is shown to include two needles 202a, 202b, with one needle being utilized to support an input flow of blood (to the assay component 130), and the other needle being utilized to support an output flow of blood (from the assay component 130). Additional examples related to such flow and analysis of blood are described herein in greater detail.

FIG. 1D shows a perspective view of an underside of a wearable patch 100 that can be implemented for the wearable patch 100 of FIG. 1B. In the example of FIG. 1D, the wearable patch 100 is shown to include a plurality of input needles 202a, 202b, 202c and a plurality of output needles 202d, 202e, 202f provided to support operation of the assay component 130. Additional examples related to such flow and analysis of blood are described herein in greater detail.

Among others, International Publication Number WO 2021/163341 (International Application Number PCT/US2021/017679 titled DIAGNOSTIC PATCHES AND BRACELETS FOR PROMOTING PERSONAL AND COMMUNITY HEALTH INCLUDING RELATED PROCESSES, METHODS, AND SYSTEMS), which is hereby expressly incorporated by reference herein in its entirety, includes examples of flow and analysis of blood that can be achieved by a wearable patch having one or more features as described herein.

Figure 2:
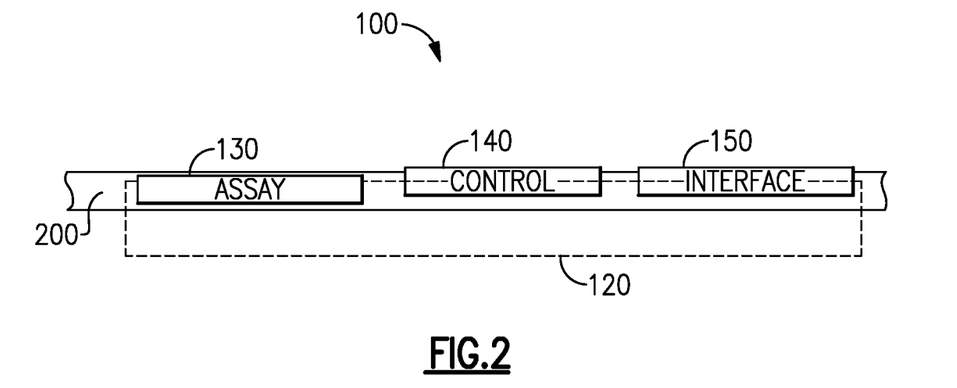
FIG. 2 depicts a side view of a wearable patch having one or more features as described herein.

FIG. 2 depicts a side view of a wearable patch 100 having one or more features as described herein. In some embodiments, the wearable patch 100 can include a patch layer 200 configured to allow implementation of one or more functionalities as described herein, and to allow the wearable patch 100 to be worn by a user.

In some embodiments, a continuous flow assembly 120 as described herein can be implemented on a side of the patch layer 200 that engages a skin surface of a user. In the example of FIG. 2, such a side is depicted as being on the bottom of the patch layer 200 when the patch 100 is oriented as shown.

In some embodiments, the continuous flow assembly 120 can support input and output of fluid such as blood to and from an assay component 130 configured to perform one or more assays. As least some portion of the assay component 130 can be controlled by a control component 140. In some embodiments, the patch 100 can further include an interface component 150 in communication with the control component 140. Such an interface component can be configured to, for example, alert the user (wearing the patch 100) of a selected condition detected by the assay component 130, communicate with an external monitoring device (e.g., with information related to the selected condition detected by the assay component 130), etc.

Figure 3A:
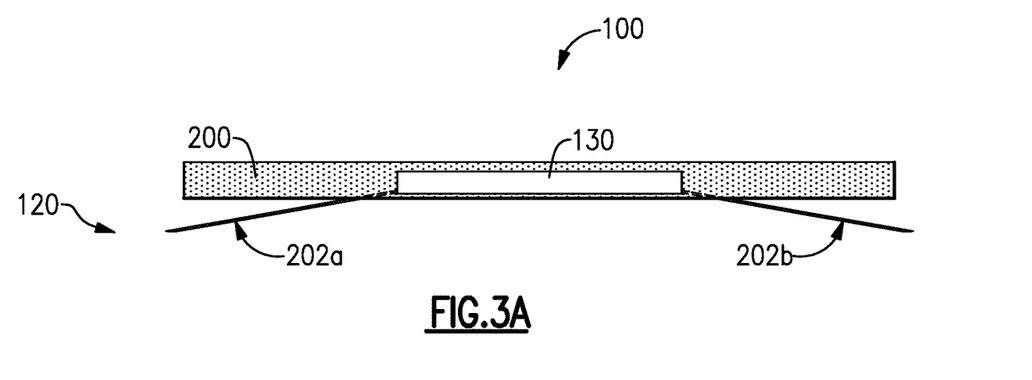
FIG. 3A shows an example of a patch having a continuous flow assembly implemented on a side of the patch that engages, for example, a skin surface of a user.
Figure 3B:
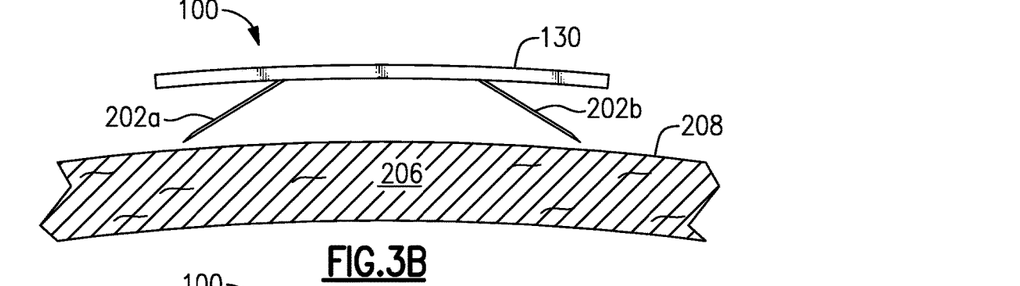
FIG. 3B shows the patch of FIG. 3A positioned next to a skin surface of a user.

FIG. 3A shows an example of a patch 100 having a continuous flow assembly 120 implemented on a side of the patch 100 that engages, for example, a skin surface of a user. FIG. 3B shows the patch 100 of FIG. 3A positioned next to a skin surface 208 of a user.

Figure 4A:
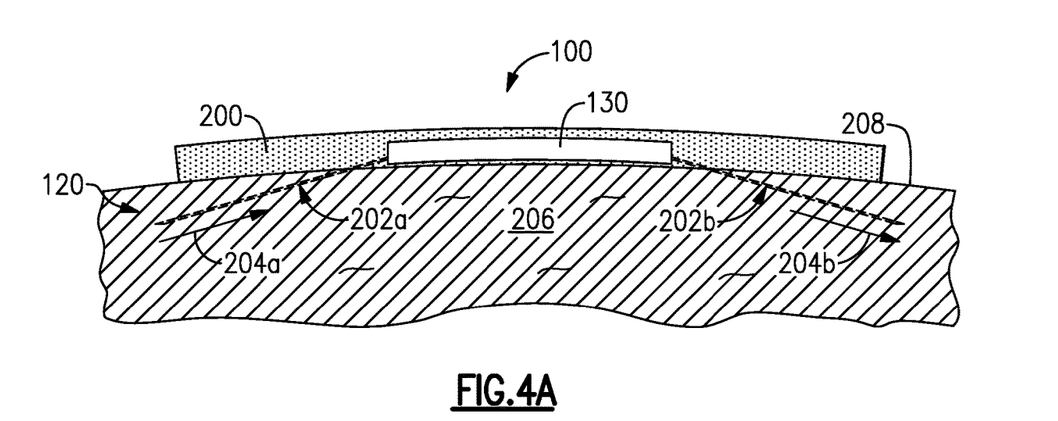
FIG. 4A shows the patch of FIG. 3B applied to the skin surface of such a user, such that input and output needles are embedded in a tissue of the user.
Figure 4B:
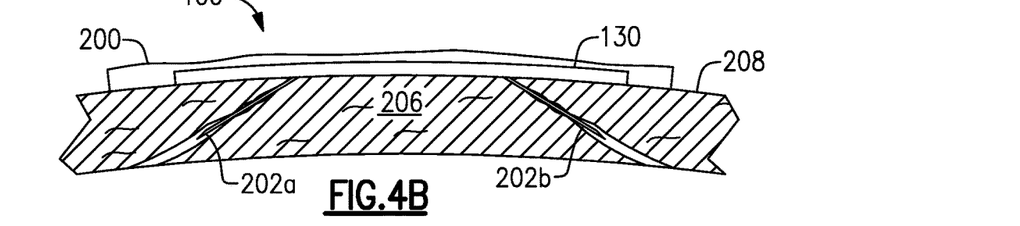
FIG. 4B shows a capillary formed in the tissue for each of input and output needles.

FIG. 4A shows the patch 100 of FIG. 3B applied to the skin surface 208 of such a user, such that input and output needles 202a, 202b are embedded in a tissue 206 of the user. FIG. 4B shows a capillary formed in the tissue 206 for each of input and output needles 202a, 202b.

Referring to FIGS. 3 and 4, in some embodiments, the continuous flow assembly 120 can include a plurality of needles (e.g., 202a, 202b) that extend from the application side of a patch layer 200 of the patch 100. Such needles are shown to be in communication with an assay component 130 so as to allow an input flow (e.g., through the first needle 202a as indicated by an arrow 204a) into the assay component 130 and an output flow (e.g., through the second needle 202b as indicated by an arrow 204b) from the assay component 130.

In some embodiments, such a flow of blood can be implemented as capillary sampling of blood from a tissue (206 in FIG. 4) of the user. Examples related to capillary blood sampling with a patch are described herein in greater detail.

For the purpose of description, it will be understood that a needle can be dimensioned and configured to be inserted into a tissue of a user and allow flow of blood therethrough at a capillary level. In some embodiments, such a needle can be formed from appropriate material(s), and can be configured to communicate with an existing and/or newly-formed capillary. Examples related to such a needle are described herein in greater detail.

Figure 5A:
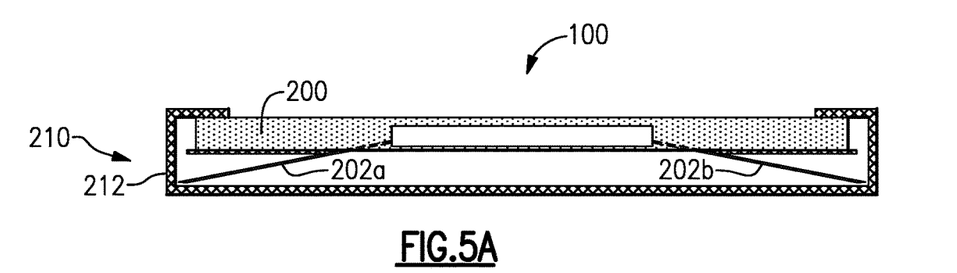
FIG. 5A shows that in some embodiments, a patch having one or more features as described herein can be part of a packaged assembly.

FIGS. 5A to 5D show an example of how the patch 100 of FIG. 3 can be applied to a user so as to provide the continuous flow sampling configuration of FIG. 4. FIG. 5A shows that in some embodiments, a patch 100 having one or more features as described herein can be part of a packaged assembly 210. For example, a protective cover 212 can be configured to provide protection for sharp ends of the needles 202a, 202b in a removable manner.

Figure 5B:
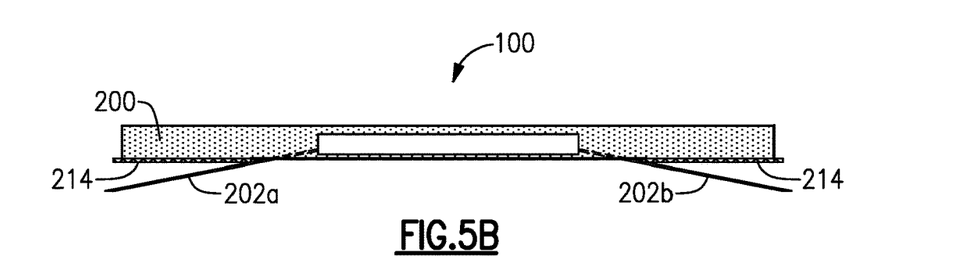
FIG. 5B shows the patch with its protective cover removed.
Figure 5C:
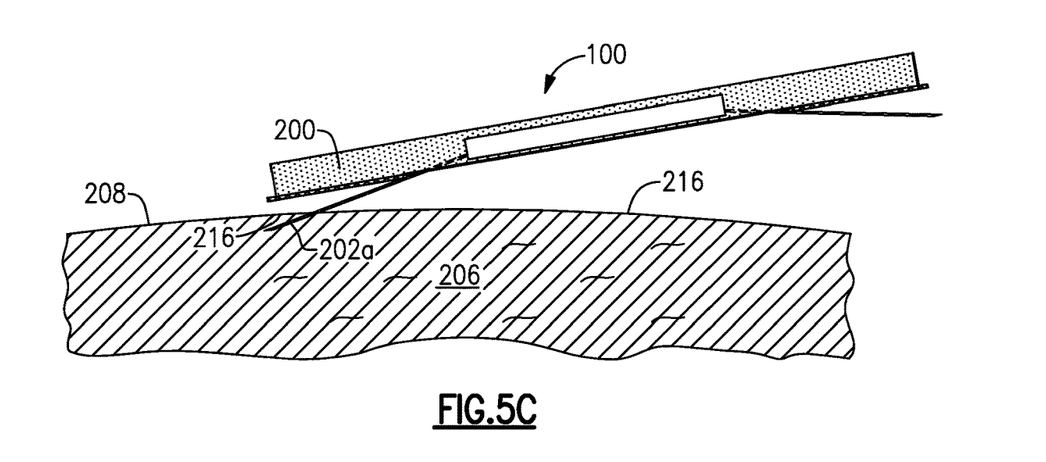
FIG. 5C shows an example where a first needle can be inserted into a tissue of the user at an insertion area on a skin surface.

FIG. 5B shows the patch 100 with its protective cover removed. FIG. 5B also shows that the patch 100 can include one or more liners 214 implemented to facilitate application and/or retention of the patch 100 on the user. For example, and as shown in FIG. 5C, a first needle 202a can be inserted into a tissue 206 of the user at an insertion area 216 on a skin surface 208. At this stage, the liner 214 of FIG. 5C can remain attached to the underside of the patch layer 200 so as to make application and positioning of the patch 100 easier. In the example of FIG. 5C, needle insertion areas are depicted as 216. Such areas can be marked by the user utilizing instructions and/or a kit to provide an appropriate spacing between the insertion points of the needles. Such markings of the insertion areas can also provide a sterile environment for the skin surface 208 for receiving the needles 202a, 202b.

Figure 5D:
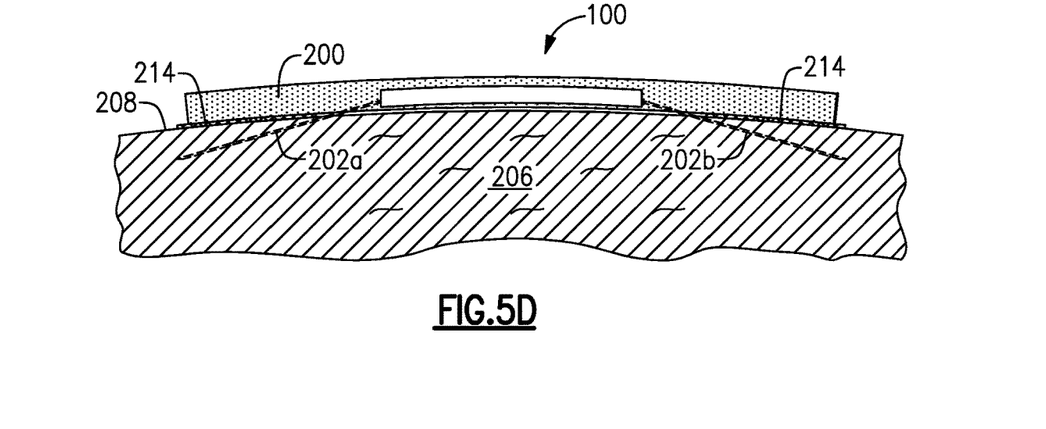
FIG. 5D shows an example where upon such insertion, the patch can be positioned so as to generally conform to the skin surface of the user.

In some embodiments, the patch layer 200 can be configured to be sufficiently flexible to allow the patch 100 to be bent to allow the second needle 202b to be inserted into the corresponding insertion area. Upon such insertion, and as shown in FIG. 5D, the patch 100 can be positioned so as to generally conform to the skin surface 208 of the user. Once in such a position, the liners 214 can be removed (e.g., lifting each end and peeling the corresponding liner 214, and then pressing down on the end to adhere to the skin surface 208) so as to position the patch 100 for operation.

Figures 6A, 7A:
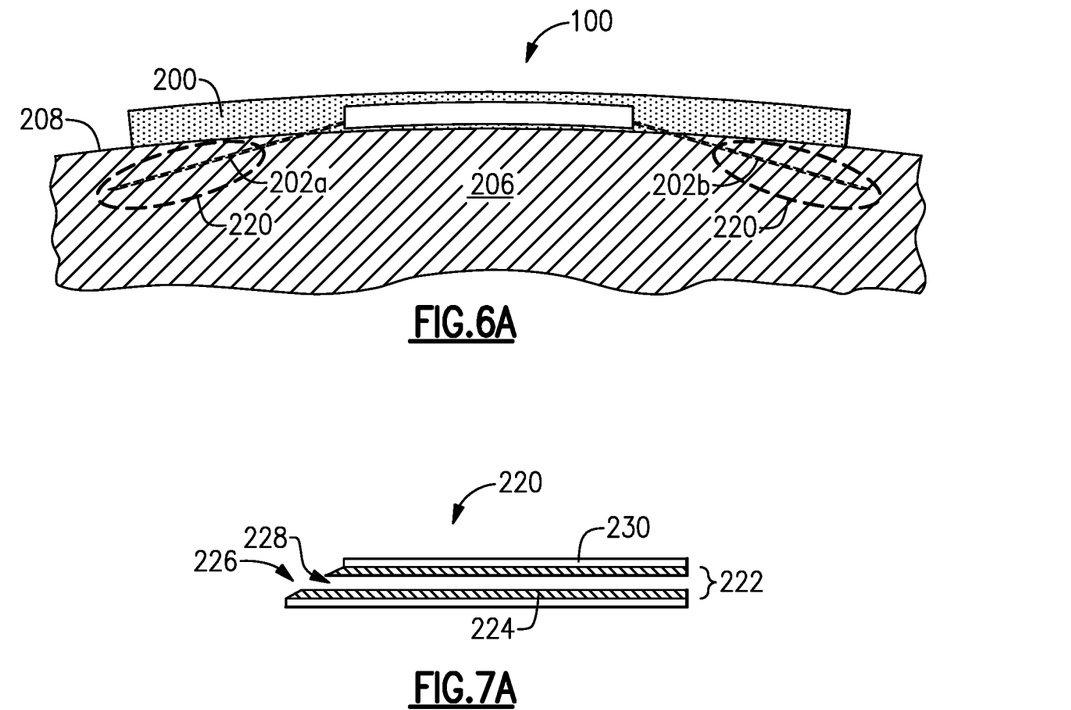
FIG. 6A shows the patch applied to the skin surface of the user, resulting from the example application process of FIGS. 5A to 5D.
FIG. 7A shows an example of an embedding portion of a needle that includes an insertion end configured to facilitate easy insertion of the needle into the tissue of the user.
Figure 6B:
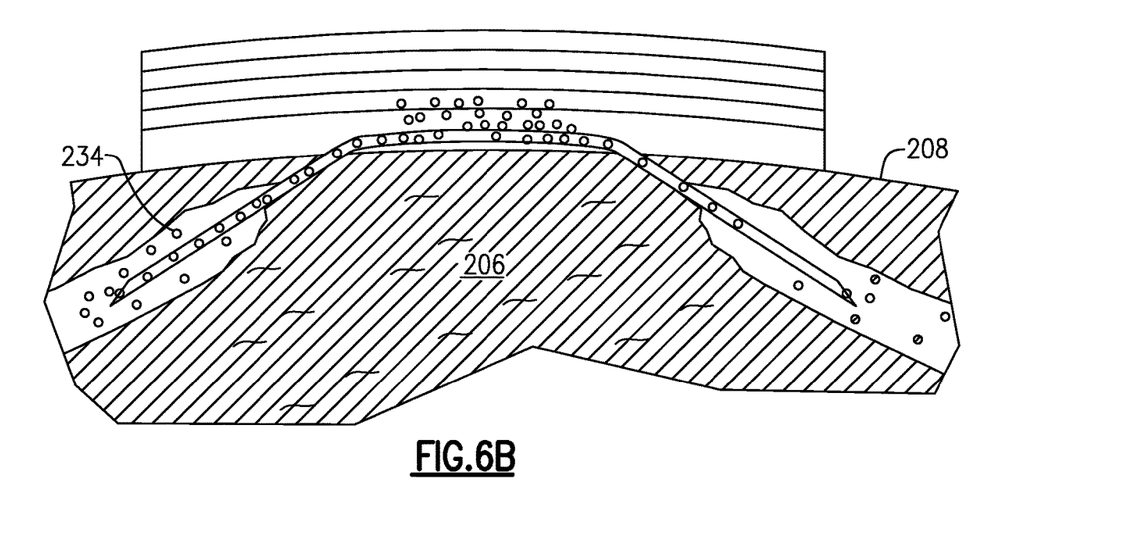
FIG. 6B shows a more detailed view of the applied-patch view of FIG. 6A.

FIG. 6A shows the patch 100 applied to the skin surface 208 of the user, resulting from the example application process of FIGS. 5A-5D. FIG. 6B shows a more detailed view of the applied-patch view of FIG. 6A, including capillaries formed in the tissue 206 for the input and output needles, and a flow of blood cells 234 that allow sampling and analysis by the analysis component 130 of the patch layer structure 200 having one or more layers.

In FIGS. 6A and 6B, the first and second example needles 202a, 202b are shown to be inserted into the tissue 206 of the user to allow capillary level sampling of blood in a continuous flow manner.

Figure 7B:
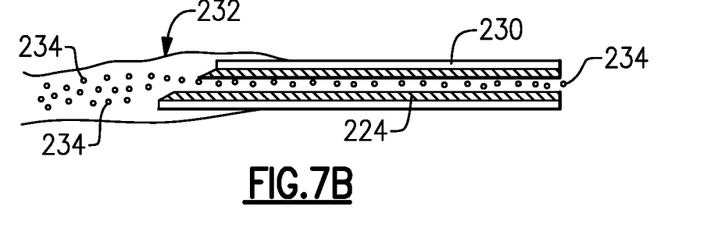
FIG. 7B shows that once a capillary is formed about the insertion end of the needle, blood can flow through a base structure of the needle.

FIGS. 6A and 6B also show an embedded portion 220 of each needle. FIGS. 7A and 7B show a more detailed view of an example of such an embedded portion of the needle (202a or 202b). In some embodiments, at least a portion of an embedding portion (e.g., 220) the needle can be provided with a coating of material that promotes formation of a capillary about the needle. Such a material can include, for example, an artificial skin material.

Referring to FIG. 7A, the embedding portion 220 of the needle is shown to include an insertion end 226 configured to facilitate easy insertion of the needle into the tissue of the user. Such an insertion end can also include an opening 228 configured to allow flow of blood through a pathway 224 defined by a base structure 222. In some embodiments, such a base structure of the needle can be formed from, for example, stainless steel (to be removed later) or a bio-digestable material (to be digested in the tissue after some time).

In the example of FIG. 7A, an artificial skin material 230 is shown to cover the embedding portion 220 of the needle's base structure 222. Accordingly, and as depicted in FIG. 7B, when the embedding portion 220 is embedded in the tissue (206 in FIG. 6), a capillary 232 can be formed around the insertion end 226 of the needle. Such a capillary can be a newly formed capillary (e.g. in response to the insertion of the needle), healing of a capillary disrupted by the needle, adaptation of an existing capillary in response to the presence of the needle, etc.

FIG. 7B shows that once the capillary 232 is formed about the insertion end of the needle, blood (e.g., including red blood cells 234) can flow through the base structure 222 of the needle. As described herein, such a flow of blood can be into the insertion end of the needle, or out of the insertion end of the needle. In some embodiments, such a flow of blood through the base structure of 222 of the needle can be substantially continuous as long as the base structure 222 remains embedded in the tissue.

Figure 8:
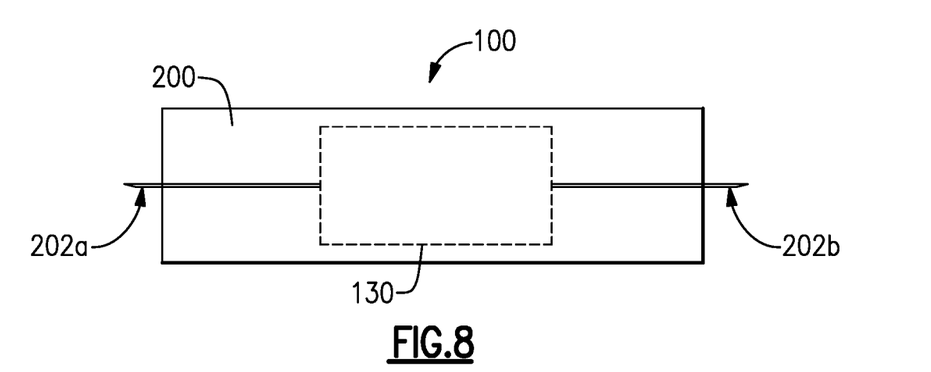
FIG. 8 shows an example underside of a patch, in which a patch layer can have a rectangular shape with an assay component embedded therein.

In the examples described in reference to FIGS. 3 to 6, each patch is depicted as including two needles 202a, 202b, with one needle being utilized to support an input flow of blood (to the assay component 130), and the other needle being utilized to support an output flow of blood (from the assay component 130). FIG. 8 shows an example underside of such a patch (100), in which a patch layer 200 can have a rectangular shape with an assay component 130 embedded therein. FIG. 8 further shows first and second needles 202a, 202b configured to provide the foregoing blood flow functionality.

In some embodiments, a patch having one or more features as described herein can include more than two needles, such that one or more needles are utilized for input of blood, and one or more needles are utilized for output of blood. For example, a plurality of needles can be implemented to provide an input of blood to an assay component of a patch, and a plurality of needles can be implemented to provide an output of blood from the assay component of the patch.

Figure 9:
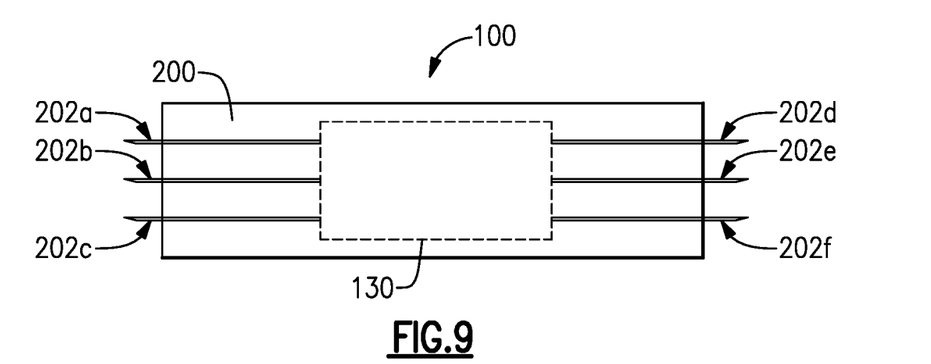
FIG. 9 shows an example of a patch having a plurality of input needles and a plurality of output needles.

FIG. 9 shows an example of a patch 100 having such a configuration of needles. More particularly, a plurality of input needles 202a, 202b, 202c can be provided, and a plurality of output needles 202d, 202e, 202f can be provided, to facilitate operation of the assay component.

In the example of FIG. 9 the number of input needles are the same as the number of output needles. It will be understood that the numbers of input and output needles may or may not be the same. It will also be understood that an input needle may or may not be configured the same as an output needle.

In the example of FIG. 9 the input needles are depicted as being positioned on one side of the patch 100, and the output needs are depicted as being positioned on the other side. It will be understood that such an arrangement is only an example, and that other arrangements of needles can also be implemented. For example, a given portion of a patch can have a mixture of input and output needles.

In the various examples of FIGS. 3 to 6, 8 and 9, various needles are depicted as projecting at an angle from the application-side of respective patches. It will be understood that such a configuration of needles is an example, and other needle configurations can also be implemented.

Figure 10:
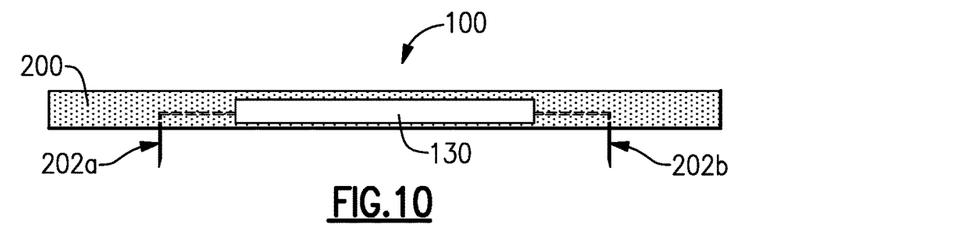
FIG. 10 shows that in some embodiments, a patch needle having one or more features as described herein can be configured to protrude from an application side of a patch in an approximately perpendicular orientation.

For example, FIG. 10 shows that in some embodiments, a patch needle having one or more features as described herein can be configured to protrude from an application side of a patch 100 in an approximately perpendicular orientation. Thus, in the example of FIG. 10, a first needle 202a can protrude downward from the underside of a patch layer 200 of the patch 100, so as to be insertable into a tissue of a user. Similarly, a second needle 202b can protrude downward from the underside of the patch layer 200 of the patch 100. In the example of FIG. 10, one of the needles (202a or 202b) can be utilized as an input needle, and the other needle (202b or 202a) can be utilized as an output needle for the assay component 130.

Figure 11:
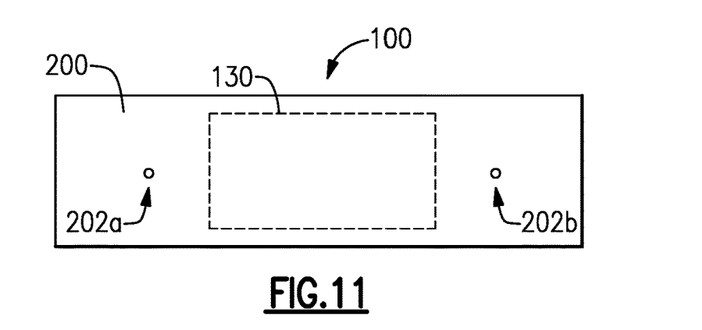
FIG. 11 shows an underside of the example patch of FIG. 10.

FIG. 11 shows an underside of the example patch 100 of FIG. 10. In the example of FIG. 11, one needles (e.g., 202a) can be utilized as an input needle, and the other needle (e.g., 202b) can be utilized as an output needle for the assay component 130. As described herein, a patch can include more than one needle for input, and/or more than one needle for output.

Figure 12:
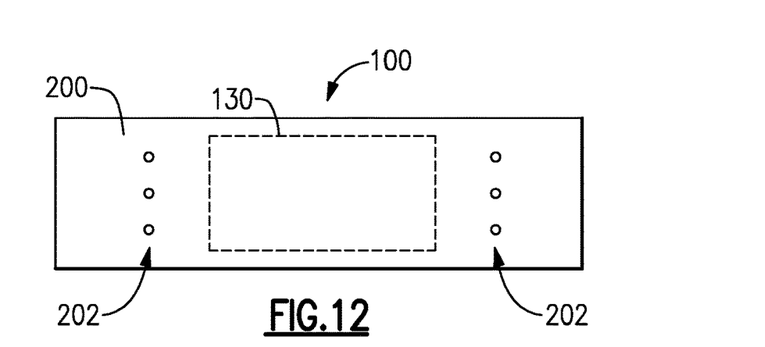
FIG. 12 shows an example of a patch having a plurality of input needles and a plurality of output needles, with each needle configured similar to the example of FIG. 10.

For example, FIG. 12 shows an example of a patch 100 having such a configuration of needles. More particularly, a plurality of input needles 202a, 202b, 202c can be provided, and a plurality of output needles 202d, 202e, 202f can be provided, to facilitate operation of the assay component 130.

In the example of FIG. 12 the number of input needles are the same as the number of output needles. It will be understood that the numbers of input and output needles may or may not be the same. It will also be understood that an input needle may or may not be configured the same as an output needle.

In the example of FIG. 12 the input needles are depicted as being positioned on one side of the patch 100, and the output needs are depicted as being positioned on the other side. It will be understood that such an arrangement is only an example, and that other arrangements of needles can also be implemented. For example, a given portion of a patch can have a mixture of input and output needles.

Figure 13:
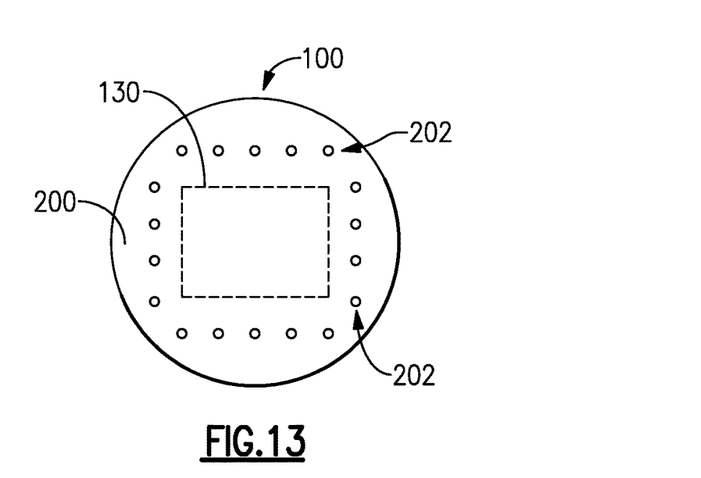
FIG. 13 shows that in some embodiments, a patch having one or more features as described herein can have a lateral shape other than the example rectangular shape.

FIG. 13 shows that in some embodiments, a patch 100 having one or more features as described herein can have a lateral shape other than the example rectangular shape. For example, a rounded shape such as a circular shape can be implemented for a patch layer 200 of a patch 100. Within such a patch layer, an assay component 130 can be provided; and input and output of blood for the assay component 130 can be provided by a plurality of needles 202.

Figure 14A:
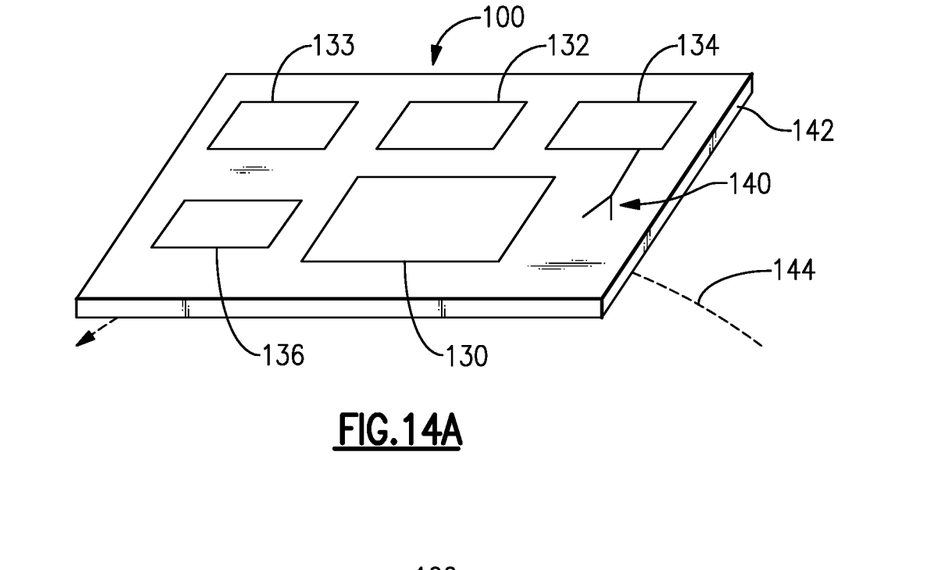
FIGS. 14A and 14B show a patch that can be an example of a bio-patch having one or more features as described herein in reference to FIGS. 1 to 13.
Figure 14B:
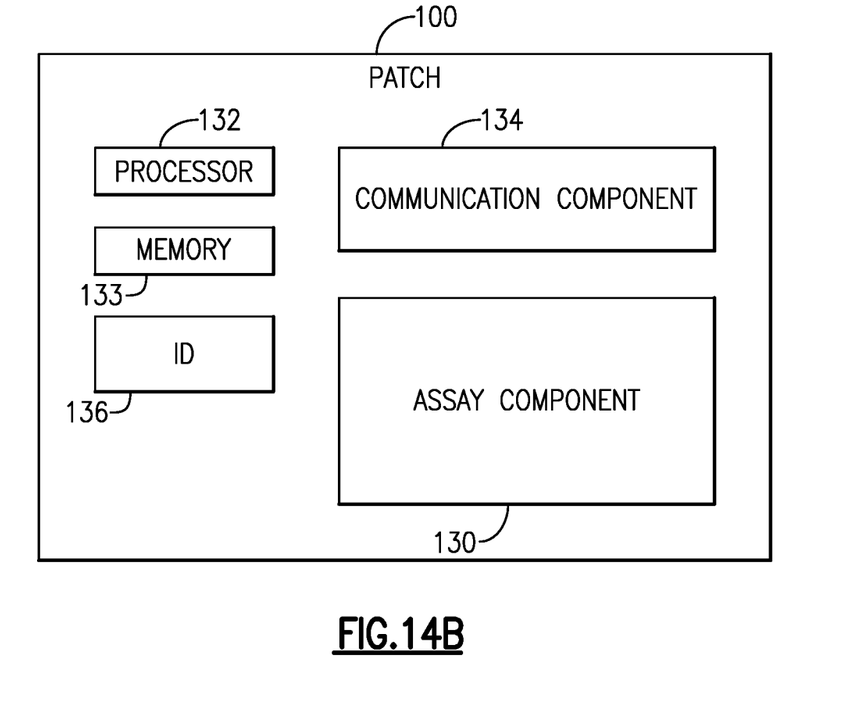

FIGS. 14A and 14B show a patch 100 that can be an example of the bio-patch described herein in reference to FIGS. 1 to 13. More particularly, the patch 100 of FIGS. 14A and 14B can be configured to include a number of components implemented to allow, for example, one or more assays with a continuous flow of blood, and notification of results of such assay(s) to a monitoring device or system. Accordingly, the patch 100 can include a component 130 configured to perform an assay with continuous flow of blood, and a communication component 134 configured to transmit information resulting from the assay. In embodiments where such transmission of information is achieved in a wireless manner, the patch 100 can further include an antenna 140 configured to facilitate the transmission.

In some embodiments, the patch 100 can further include an identifier component 136 configured to provide information about the identity of the patch 100, and therefore, the identity of the user wearing the patch. In some embodiments, information transmitted by the communication component 134 can include the foregoing identifier information.

In some embodiments, some or all of the functionalities associated with the various components of the patch 100 can be controlled and/or facilitated by a processor 132. Similarly, a memory 133 can also be provided to facilitate various functionalities of the patch 100. Such processor and memory can have functionalities as described herein.

In some embodiments, the patch 100 can include a support structure 142 configured to support various components, such as the components shown in FIGS. 14A and 14B. Such a support structure can include one or more layers, and can be implemented in a number of wearable forms. Examples of such a support structure and different wearable forms are provided in the above-referenced International Publication Number WO 2021/163341.

In some embodiments, biological fluid such as blood can be obtained by the patch 100, and the assay can be performed with such a biological fluid. In some embodiments, such biological fluid can be sampled by the patch 100 from a continuous flow as described herein. In the example of FIG. 14A, such a flow can be depicted as 144.

Figure 15:
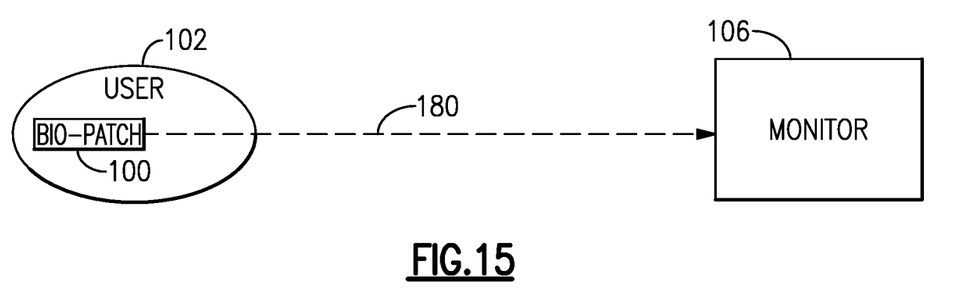
FIG. 15 shows an example of a system that can be implemented to include a communication functionality.

As described herein in reference to FIGS. 14A and 14B, a patch having one or more features as described herein can include a communication component to facilitate transmission of information such as assay data. FIG. 15 shows an example of a system that can be implemented to utilize such a communication functionality. For example, a patch 100 having one or more features as described herein is shown to be worn by a user 102. Information transmitted (e.g., in a wireless manner) is depicted as 180, and such information can be received by a monitor 106. Such a monitor can include a receiver circuit configured to process the received signal from the patch 100. The monitor 106 can further include a processor to facilitate, for example, notification of the assay data to another location.

Figure 16:
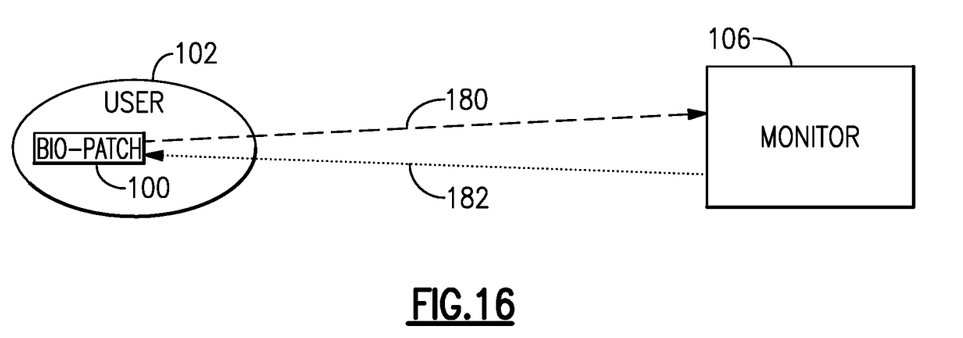
FIG. 16 shows an example of a system that can be implemented to include transmit and receive functionalities.

In some embodiments, a patch having one or more features as described herein can also include a receiver circuit to allow the patch to receive information such as instructions, diagnostics, etc. Accordingly, FIG. 16 shows an example of a system that can be implemented to utilize such transmit and receive functionalities. For example, a patch 100 having one or more features as described herein is shown to be worn by a user 102. Information transmitted (e.g., in a wireless manner) is depicted as 180, and such information can be received and processed by a monitor 106, similar to the example of FIG. 15.

In the example of FIG. 16, the patch 100 can also receive information (indicated as 182). Such received information can be achieved in a wireless mode, a wire mode, or any combination thereof. Although such information is depicted as being provided by the monitor 106, it will be understood that information provided to the patch 100 may or may not be from the same component (e.g., monitor 106 in FIG. 16).

Figure 17:
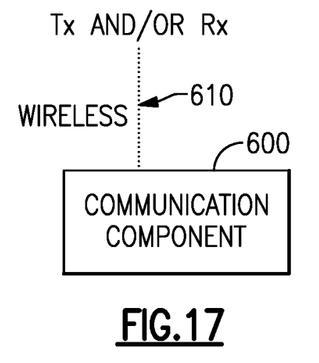
FIG. 17 shows that in some embodiments, a communication component of a patch can be configured to support wireless communication with an external device.
Figure 18:
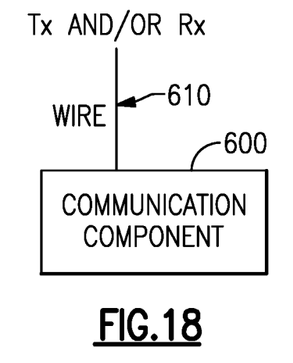
FIG. 18 shows that in some embodiments, a communication component of a patch can be configured to support wired communication with an external device.

FIGS. 17 to 21 show examples of communications and/or system functionalities that can be implemented in a system having one or more patches as described herein. For example, FIGS. 17 and 18 show that in some embodiments, a communication component 600 (e.g., 134 in FIGS. 14A and 14B) of a patch can be configured to provide a wireless communication (depicted as 610 in FIG. 17) with an external device, a wired communication (depicted as 610 in FIG. 18) with an external device, or some combination thereof. For the purpose of description of FIGS. 17 and 18, an external device can be another patch, a non-patch device, etc.

In some embodiments, in each of the examples of FIGS. 17 and 18, the wireless and/or wired communication link 610 can include a transmit (Tx) functionality (relative to the corresponding patch), a receive (Rx) functionality, or any combination thereof.

Figure 19:
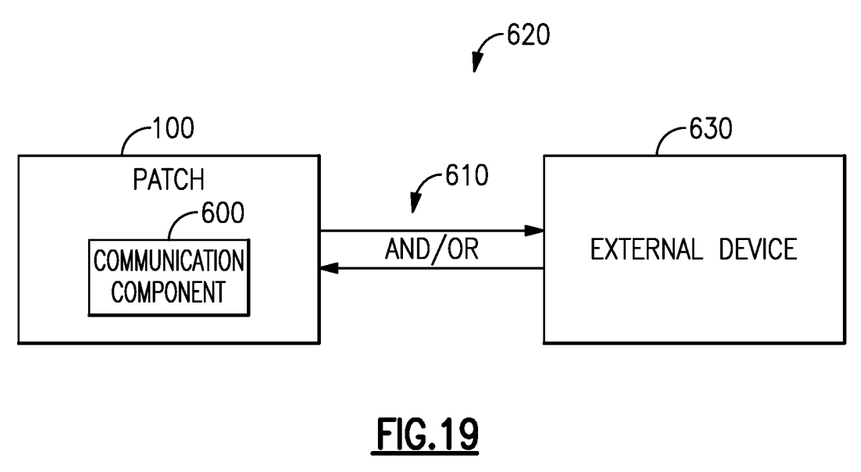
FIG. 19 shows a system that can be formed with one or more patches as described herein, and an external device.

FIG. 19 shows a system 620 that can be formed with one or more patches 100 as described herein, and an external device 630. For the purpose of description of FIG. 19, it will be understood that the external device 630 is relative to the patch 100. Thus, if the external device 630 is another patch, then the patch 100 shown in FIG. 19 can be considered to be external to the other patch (630). As described in reference to FIGS. 17 and 18, it will be understood that the external device 630 can be a patch that may or may not be similar to the patch 100.

In the example of FIG. 19, the patch 100 is shown to include a communication component similar to the examples of FIGS. 17 and 18. Accordingly, the communication between the patch 100 and the external device 630 can include transmit and/or receive portions.

Figure 20:
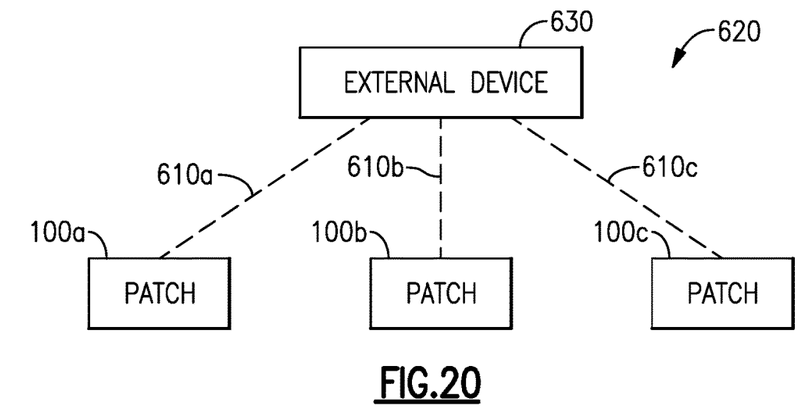
FIG. 20 shows that in some embodiments, the system of FIG. 19 can include a plurality of patches that communicate with a common external device.

FIG. 20 shows that in some embodiments, the system 620 of FIG. 19 can include a plurality of patches 100 that communicate with a common external device. For example, a system 620 of FIG. 20 is shown to include a plurality of patches 100*a*, 100*b*, 100*c* and an external device 630. More particularly, the first patch 100*a* can be in communication (610*a*) with the external device 630, the second patch 100*b* can be in communication (610*b*) with the external device 630, and the third patch 100*c* can be in communication (610*c*) with the external device 630. In some embodiments, such an external device can be configured to, for example, coordinate operations of the patches (100*a*, 100*b*, 100*c*), collect data from the patches, etc. In some embodiments, the external device 630 can be configured to communicate with another device at a similar level, with another device at a higher level, or any combination thereof.

Figure 21:
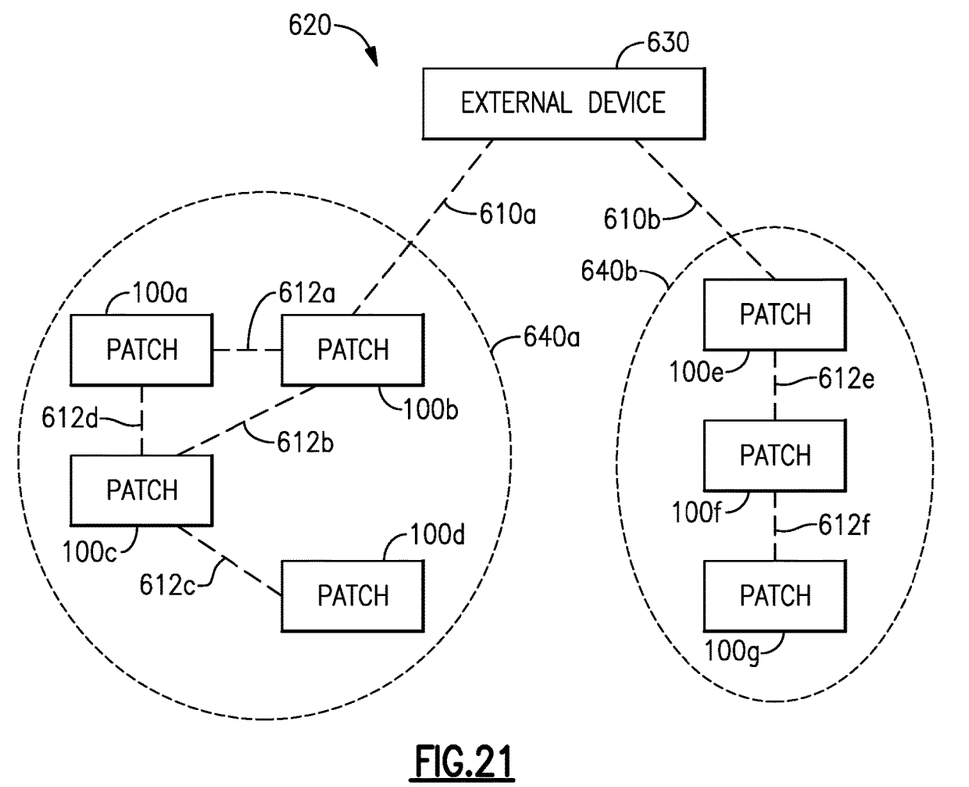
FIG. 21 shows that in some embodiments, the system of FIG. 19 can include a plurality of patches that can communicate with each other, and/or with an external device.

FIG. 21 shows that in some embodiments, the system 620 of FIG. 19 can include a plurality of patches 100 that can communicate with each other, and/or with an external device. For example, a first group (640*a*) of patches and a second group (640*b*) are shown to be included in a system 620, and generally in communication with an external device 630. More particularly, the first group 640*a* is shown to include four example patches 100*a*, 100*b*, 100*c*, 100*d*, and the second group 640*b* is shown to include three example patches 100*e*, 100*f*, 100*g*. Such first and second groups 640*a*, 640*b* of patches can be grouped based on, for example, physical proximity/separation, different functionalities, etc.

In some embodiments, within a given group, each of the plurality of patches can communicate directly with the external device 630, through a representative patch, or some combination thereon. For example, for the first group 640*a*, the patches 100*a* and 100*b* are shown to have a communication link 612*a*; the patches 100*a* and 100*c* are shown to have a communication link 612*d*; the patches 100*c* and 100*d* are shown to have a communication link 612*c*; and the patches 100*c* and 100*b* are shown to have a communication link 612*b*. Further, the patch 100*b* is shown to be a representative communication member and be in communication (610*a*) with the external device 630.

In another example, for the second group 640*b*, the patches 100*e* and 100*f* are shown to have a communication link 612*e*; and the patches 100*f* and 100*g* are shown to have a communication link 612*f*. Further, the patch 100*e* is shown to be a representative communication member and be in communication (610*b*) with the external device 630.

In some embodiments, the communication links between the patches within a given group can be based on, for example, relative proximity/distance among the users wearing the respective patches, some hierarchy of the users and/or patches, or some combination thereof. In some embodiments, the communication links between the patches can be configured as a mesh network, or be based on such a network.

In some embodiments, a system of patches as described herein (e.g., in reference to FIGS. 17 to 21) can provide a system level information that may not be available from an individual patch.

In various examples described herein, the continuous flow feature provided by a patch is described as supporting an assay component to analyze the flowing blood. In some embodiments, such an analysis can be utilized as, for example, a diagnostic tool to detect a health condition.

In some embodiments, however, a patch having one or more condition can be utilized to perform some action on the flowing blood. For example, blood obtained from a user and flowing through the patch can be treated and returned to the user. A dialysis is an example treatment that can be implemented in such a patch.

Thus, and by way of examples, a patch having one or more features as described herein can be implemented as a micro-bio-diagnostic machine or a micro-bio-dialysis machine.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wearable patch comprising:
   a patch structure having one or more layers and configured to be flexible to allow the patch to be worn by a user;
   an assay component implemented on or at least partially within the patch structure, and configured to obtain a blood sample of the user and perform an assay on the blood sample; and
   a flow assembly having an input needle in communication with the assay component and an output needle in communication with the assay component to provide a continuous flow of blood for the assay component to thereby allow the blood sample to be obtained by the assay component, each of the input and output needles configured to interface with a respective capillary in a tissue of the user, the input and output needles extending in opposite directions from the assay component.

2. The wearable device of claim 1 further comprising an interface component implemented on or at least partially within the patch structure, and in communication with the assay component, the interface component configured to provide a notification based on a result of the assay.

3. The wearable patch of claim 2 wherein the patch structure is configured to allow the patch to be worn over a skin of the user.

4. The wearable patch of claim 3 wherein the patch structure is configured to allow the patch to be worn directly on the skin of the user.

5. The wearable patch of claim 2 wherein the interface component is configured to alert the user when the assay result indicates a change that affects health of the user.

6. The wearable patch of claim 2 wherein the interface component includes a communication circuit configured to send information about the assay result.

7. The wearable patch of claim 6 wherein the communication circuit is configured to receive information.

8. The wearable patch of claim 6 wherein the communication circuit is configured to send the information in a wireless manner.

9. The wearable patch of claim 6 wherein the communication circuit is configured to send the information to an external device.

10. The wearable patch of claim 1 wherein each needle includes a base structure having an insertion end to allow flow of the blood through the insertion end, each needle further including a coating that covers the base structure and configured to promote the interfacing of the needle with the capillary.

11. The wearable patch of claim 10 wherein the coating includes an artificial skin material configured to allow formation of a capillary about the needle.

12. A kit for monitoring health condition of a user, the kit comprising:
    a wearable patch that includes a patch structure having one or more layers and configured to be flexible to allow the patch to be worn by a user; an assay component implemented on or at least partially within the patch structure, and configured to obtain a blood sample of the user and perform an assay on the blood sample; and a flow assembly having an input needle in communication with the assay component and an output needle in communication with the assay component to provide a continuous flow of blood for the assay component to thereby allow the blood sample to be obtained by the assay component, each of the input and output needles configured to interface with a respective capillary in a tissue of the user, the input and output needles extending in opposite directions from the assay component; and
    a printed instruction configured to facilitate use of the wearable patch.

13. A blood analysis system comprising:
    a wearable patch that includes a patch structure having one or more layers and configured to be flexible to allow the patch to be worn by a user, the wearable patch further including an assay component implemented on or at least partially within the patch structure, and configured to obtain a blood sample of the user and perform an assay on the blood sample, the wearable patch further including a flow assembly having an input needle in communication with the assay component and an output needle in communication with the assay component to provide a continuous flow of blood for the assay component to thereby allow the blood sample to be obtained by the assay component, each of the input and output needles configured to interface with a respective capillary in a tissue of the user, the input and output needles extending in opposite directions from the assay component, the wearable patch further including an interface component implemented on or at least partially within the patch structure, and in communication with the assay component; and
    a monitor capable of communicating with the wearable patch to allow the wearable patch to communicate a result of the assay to the monitor.

14. The system of claim 13 wherein the interface component of the wearable patch is configured to support the communication between the wearable patch and the monitor.

15. The system of claim 13 wherein the patch structure is configured to allow the patch to be worn over a skin of the user, and the monitor includes an external device and/or an application being executed in the external device.

16. The system of claim 15 wherein the external device is a wireless device, and the communication between the wearable patch and the wireless device includes wireless communication.

17. The system of claim 15 wherein the wireless device includes a smartphone.

18. The system of claim 13 wherein the wearable patch is configured to receive a control signal from the monitor.

19. The system of claim 13 further comprising another wearable patch substantially same as the wearable patch, the other wearable patch configured to allow communication with the monitor.

20. The system of claim 19 wherein the wearable patch and the other wearable patch are configured to allow communication therebetween.

* * * * *